United States Patent [19]

Martins

[11] 3,858,057

[45] Dec. 31, 1974

[54] SOLID STATE RELAY

[75] Inventor: Jose V. Souto Martins, Arlington Heights, Ill.

[73] Assignee: GTE Automatic Electric Laboratories Incorporated, Northlake, Ill.

[22] Filed: Nov. 28, 1973

[21] Appl. No.: 419,822

[52] U.S. Cl. .................. 307/254, 307/239, 307/248, 307/257, 307/321

[51] Int. Cl. .............................................. H03k 17/00

[58] Field of Search ........ 307/239, 247 R, 248, 249, 307/250, 253–255, 257, 296, 297, 321; 170/70 R

[56] References Cited

UNITED STATES PATENTS

| | | | |
|---|---|---|---|
| 3,041,475 | 6/1962 | Fisher, Jr. | 307/257 |
| 3,170,037 | 2/1965 | Carver et al. | 307/255 |
| 3,239,685 | 3/1966 | Sano et al. | 307/257 |
| 3,286,030 | 11/1966 | Puckett et al. | 307/254 |
| 3,328,600 | 6/1967 | Turja et al. | 307/255 |
| 3,581,112 | 5/1971 | Laderach | 307/254 |

OTHER PUBLICATIONS

"Bilateral Semiconductor Switch Has Zero Impedance" in Electronic Design 14, July 4, 1968, pages 112–113.

*Primary Examiner*—Stanley D. Miller, Jr.
*Attorney, Agent, or Firm*—Robert F. Van Epps

[57] ABSTRACT

A solid state relay which does not include mechanical contacts but uses instead a diode bridge circuit as a contact arrangement for selective isolation of the relay from the external load circuit. The diode bridge circuit is rendered conductive during each half cycle of an A.C. signal by a control element which connects the diode bridge circuit across the secondary of a transformer, the primary winding of which is coupled to the A.C. source. The diode bridge contact arrangement provides a bilateral output and by properly matching the diodes comprising the diode bridge the voltage drop across the output terminals can be made virtually zero.

3 Claims, 2 Drawing Figures

SOLID STATE RELAY

BACKGROUND OF THE INVENTION

The present invention is directed to an electronic relay and in particular to a solid state relay which is the equivalent of the common electromechanical relay.

As well known, a relay is a device which can assume two distinct states. One such state is a low impedance state which can be utilized to complete an external load circuit. The other state is a high impedance state for opening a connected load circuit. Such relays are normally configured to switch between the two states in response to applied input signals.

It is therefore an object of the present invention to provide an improved solid state electronic relay.

It is a further object of the present invention to provide a solid state relay which has a purely resistive input, a bilateral output, and minimized contact voltage drop.

In general, the present invention provides a solid state relay of the type which includes a resistive input for providing a control effect in response to input signals, an oscillator for providing an A.C. electrical output in response to the input control effect and a pair of output terminals adapted for connection to the external load to be completed. The invention is the improvement comprising a transformer, a diode bridge and a control element. The primary winding of the transformer is coupled to the oscillator and the secondary winding is coupled to the diode bridge, which bridge is coupled in turn to the output terminals of the relay. The control element, which may be a transistor, is interposed between the diode bridge and the transformer secondary for connecting the diode bridge across the transformer secondary during each half cycle of the oscillator thereby rendering the diode bridge continuously conductive and providing continuous relay action at the output load terminals.

BRIEF DESCRIPTION OF THE DRAWINGS

The invention, together with further objects and advantages thereof, may best be understood by reference to the following description in conjunction with the accompanying drawings and in the several figures of which like reference numerals indicate identical elements and in which.

DESCRIPTION OF THE PREFERRED EMBODIMENTS

Figure 1:
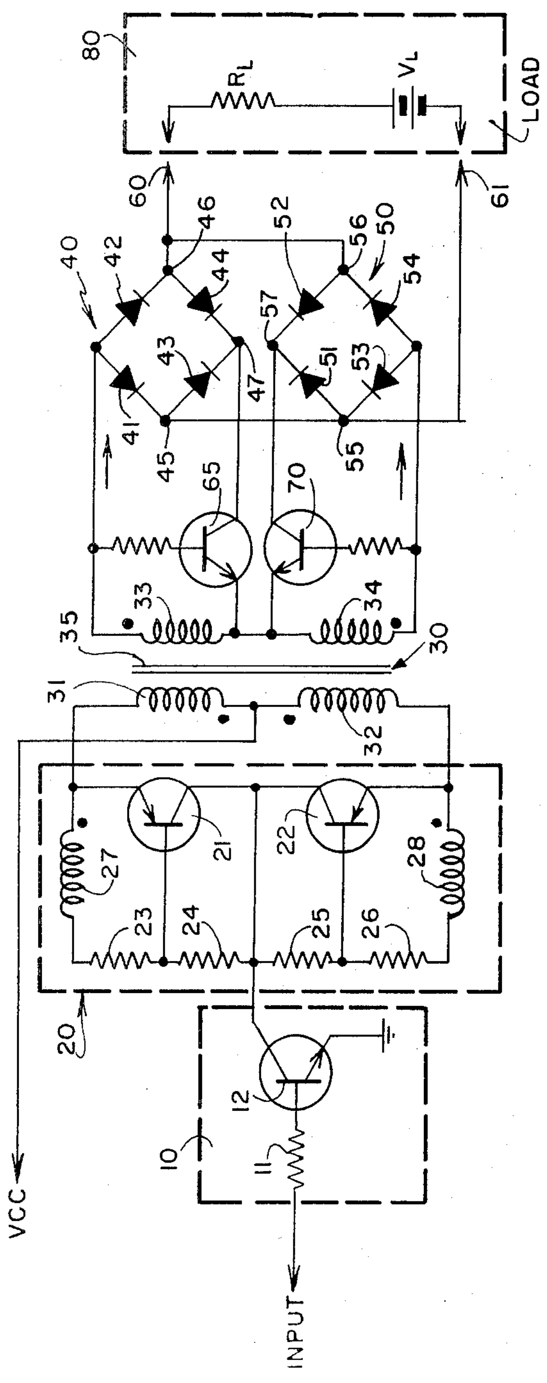
FIG. 1 is a schematic circuit diagram of a solid state relay embodying the present invention.

Referring now to FIG. 1, there is shown a schematic circuit diagram of a solid state relay embodying the present invention. The relay comprises resistive input 10, oscillator 20, transformer 30, diode bridge circuits 40 and 50, output terminals 60 and 61, and control elements 65 and 70.

The resistive input 10 comprises resistor 11 and transistor 12. Resistor 11 is coupled to the base of transistor 12 at one end, and is adapted to receive at the other end appropriate D.C. input signals for controlling the relay. Transistor 12 has its emitter coupled to ground and its collector couples the resistive input to oscillator 20.

Oscillator 20 comprises transistors 21 and 22, resistors 23, 24, 25 and 26 and transformer windings 27 and 28. The oscillator is coupled to a source of electric potential designated Vcc.

Coupled to oscillator 20 is transformer 30. Transformer 30 comprises primary windings 31, 32, a pair of secondary windings 33, 34 and magnetic core 35. As previously mentioned, transformer 30 additionally includes windings 27 and 28 which provide feedback for oscillator 20 to sustain oscillation thereof.

Coupled to one end of each of the transformer secondaries 33, 34 are diode bridge circuits 40 and 50 respectively, each including four diodes. Diode bridge circuit 40 comprises diodes 41, 42, 43 and 44 and diode bridge circuit 50 comprises diodes 51, 52, 53 and 54. The diode bridge circuits provide the relay contact action and are connected to the pair of output terminals 60, 61 of the relay. Diode bridge 40 is connected to the output terminals at junction 45 and junction 46. Diode bridge 50 is connected to the output terminals at junction 55 and junction 56.

Coupling each diode bridge circuit across its associated secondary winding is a transistor control element. Transistor 65 is coupled between the other end of secondary winding 33 and diode bridge circuit 40 at junction 47. Transistor 70 is coupled between the other end of secondary winding 34 and diode bridge circuit 50 at junction 57. The transistor control elements connect their associated diode bridge circuits across their associated secondary windings on alternate half cycles of the oscillator 20 when the control transistors are conducting. When the connection is made between the diode bridges and the transformer secondaries, the transformer secondaries forward bias the diode bridge circuits to render them conductive.

In operation, when a D.C. input signal voltage sufficient to turn on transistor 12 is applied to resistor 11, oscillator 20 in response to the resistive input 10 control effect, begins to oscillate providing an A.C. electrical output across the primary windings 31, 32 of transformer 30. The A.C. signal induced in the transformer secondaries 33, 34 will cause transistors 65 and 70 to conduct on alternate half cycles thereby connecting diode bridge circuits 40 and 50 across secondary windings 33 and 34 respectively on alternate half cycles.

When the diode bridge circuits are connected across their associated transformer secondaries they are forward biased by the A.C. signal across the secondary. This renders them conductive to thereby complete the external load circuit 80 which is coupled to output terminals 60 and 61.

Because each diode bridge circuit is conductive on alternate cycles of the oscillator, the external circuit is continuously completed. The diode bridge circuits provide a bilateral output, that is to say, when each is conductive, current can flow in either direction through them.

From the foregoing, it is evident that the relay of the present invention is truly solid state. There are no moving mechanical elements, therefore high reliability is assured. Isolation between the input and output is provided by transformer 30 and a bilateral output is provided. Because the input is purely resistive, there is no need for voltage suppressing networks to protect the input signal producing circuits, the solid state relay of the present invention is also directly compatible with bipolar devices, including TTL devices. Furthermore, by properly matching the diodes of each bridge, the contact voltage drop can be made essentially zero.

Figure 2:
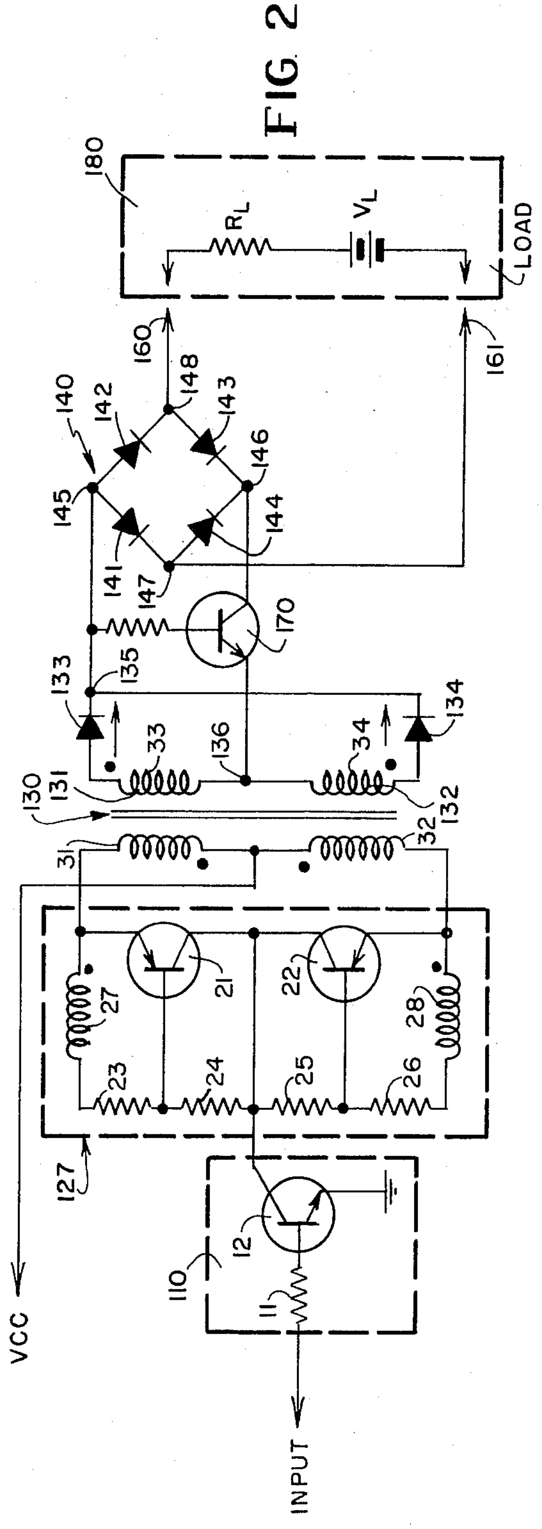
FIG. 2 is a schematic circuit diagram of another form in which the solid state relay of the present invention may take.

Referring now to FIG. 2, there is shown a schematic circuit diagram of another form in which the solid state relay of the present invention may take. Like the embodiment shown in FIG. 1, the relay of FIG. 2 includes a resistive input 110, an oscillator 127, a transformer 130 and a pair of output terminals 160 and 161 adapted for connection to an external load circuit 180 to be completed. Inasmuch as the resistive input and oscillator are identical to that shown in FIG. 1, they will not be described in detail here.

Transformer 130 has a center tapped secondary comprising windings 131 and 132. The secondary of transformer 130 is arranged in a full-wave rectifier configuration including diodes 133 and 134 joining at a common junction 135. When oscillator 127 oscillates, there will be a pulsating D.C. signal produced at junction 135.

The relay additionally includes a diode bridge circuit 140 comprising diodes 141, 142, 143 and 144. Diode bridge circuit 140 is coupled to the full-wave rectifier at junction 135 and junction 145 and to output terminals 160 and 161 at junctions 147 and 148.

Coupled between center tap 136 and junction 146 of diode bridge 140 is transistor control element 170. Control transistor 170 connects diode bridge 140 across each side of the full-wave rectifier during alternating oscillator half cycles. Thus, the diode bridge is forward biased by the full-wave rectifier during each half cycle of the oscillator rendering it continuously forward biased and conductive.

In operation, when a D.C. input signal is applied to resistive input 110 sufficient for it to provide a control effect and to cause oscillator 127 to oscillate, the A.C. signal generated across secondary windings 131 and 132 will cause transistor 170 to conduct during each half cycle. The diode bridge circuit 140 will be forward biased by each side of the full-wave rectifier on alternate half cycles and therefore will be continuously conductive. An external circuit 180 coupled to output terminals 160 and 161 will thus be completed.

As in the embodiment of FIG. 1, the diode bridge 140 when conductive will provide a bilateral output to allow the passage of current in either direction therethrough.

Of course, when the input signal to resistive input 110 is terminated, the oscillator will cease to oscillate and transistor 170 will be shut off. This disconnects the diode bridge circuit 140 from the rectifier and renders the diode bridge nonconductive opening the external circuit coupled to the output terminals.

The embodiment as shown in FIG. 2 has all of the features and advantages of the embodiment in FIG. 1 but in addition, has the added advantage of requiring fewer components resulting in lower cost and higher reliability.

While particular embodiments of the invention have been shown and described, modifications may be made, and it is intended in the appended claims to cover all such modifications as may fall within the spirit and scope of the invention.

I claim:

1. A solid state relay for completing an external load circuit in response to an input signal, said relay comprising a resistive input circuit for providing an input control signal in response to said input signal;

an oscillator circuit coupled to said input circuit and providing an a.c. electrical output in response to said input control signal;

a transformer having a primary winding coupled to said oscillator and a center tapped secondary winding;

first and second diodes coupled one to each side of said secondary winding in a full-wave rectifier configuration;

a four diode bridge having first and second input terminals, first and second output terminals coupled across said external load circuit, and having said first input terminal coupled to said secondary winding; and a control transistor coupled between the center tap of said secondary winding and the second input of said diode bridge, whereby, in response to an input signal which activates said oscillator, said control transistor couples said diode bridge to alternate sides of said secondary winding during alternate half cycles of said a.c. output of said oscillator thereby forward biasing said diode bridge rendering it conductive and completing said external load circuit.

2. A solid state relay as recited in claim 1 wherein said resistive input circuit comprises a transistor and a resistor, said resistor coupled at one end to the base of said transistor and adapted at the other end to receive said input signal.

3. A solid state relay as recited in claim 1 wherein the diodes of said diode bridge are substantially matched as to their electrical characteristics such that the voltage drop across the output terminals of said bridge is substantially zero.

* * * * *